W. E. WILLIAMS.
STEEL RIM WHEEL.
APPLICATION FILED JAN. 12, 1920. RENEWED APR. 2, 1921.
1,402,030.
Patented Jan. 3, 1922.
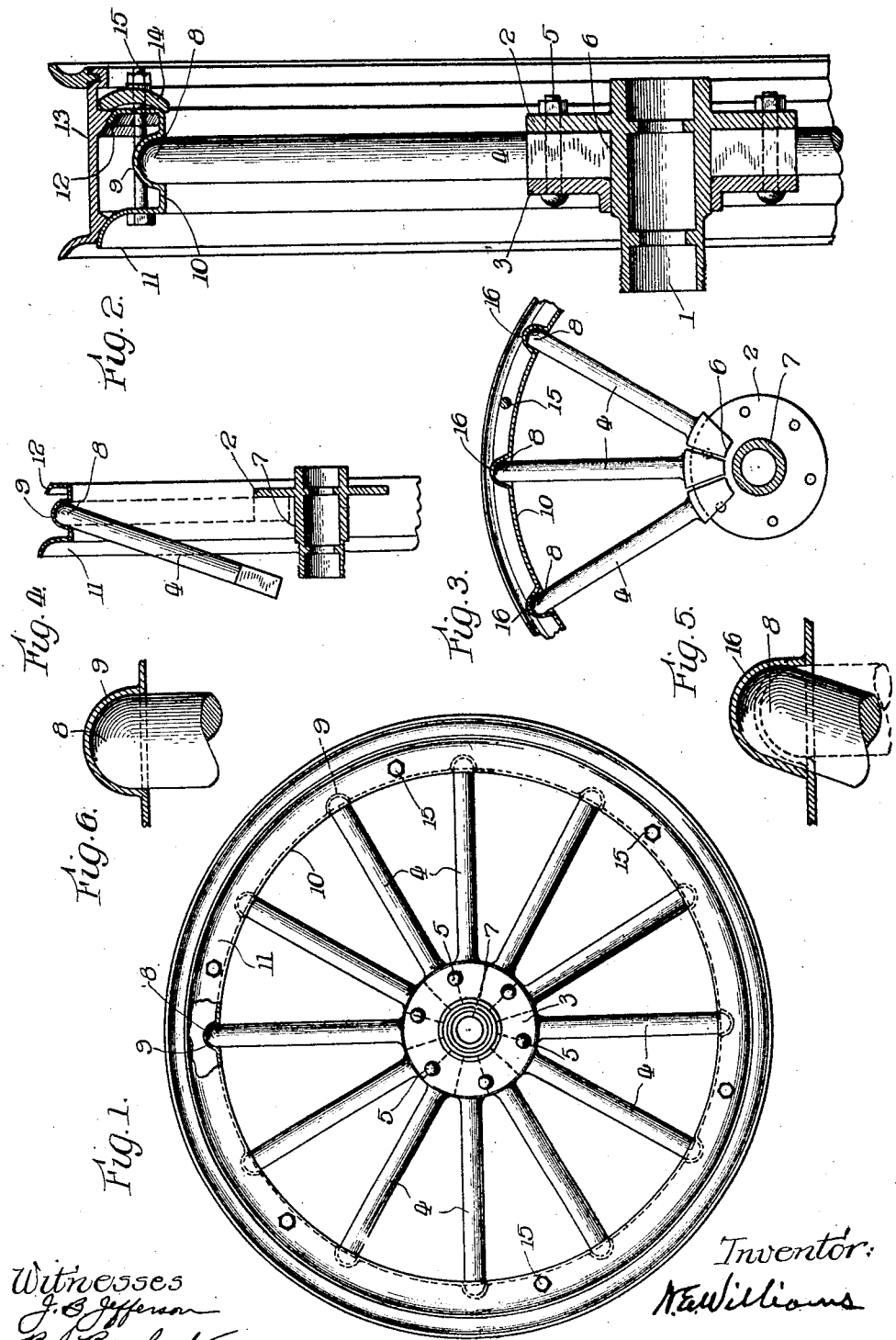

UNITED STATES PATENT OFFICE.

WILLIAM ERASTUS WILLIAMS, OF CHICAGO, ILLINOIS.

STEEL-RIM WHEEL.

1,402,030.  Specification of Letters Patent.  Patented Jan. 3, 1922.

Application filed January 12, 1920, Serial No. 350,967. Renewed April 2, 1921. Serial No. 458,082.

*To all whom it may concern:*

Be it known that I, WILLIAM ERASTUS WILLIAMS, a citizen of the United States, a resident of Chicago, in the county of Cook and State of Illinois, have invented a new and useful Improvement in Steel-Rim Wheels, of which the following is a specification.

My invention relates to wheels which ordinarily are made up with wooden spokes, yet metal ones may be used as well, and the rim is made of metal provided with peculiarly constructed spoke end pockets or seats which facilitate in assembling the parts into a wheel.

The object of my invention is to construct a wheel of the type shown that will permit the wheel to be cheaply and quickly made and yet supply a serviceable wheel.

Reference will be had to the accompanying drawings, in which Figure 1 is a front elevation of the wheel, with some parts broken away.

Figure 2 is a transverse sectional elevation on a larger scale than that of Figure 1, showing a part of the wheel.

Figure 3 is a sectional elevation and Figure 4 a transverse section, illustrating the method of assembling the wheel parts.

Figure 5 is an enlarged sectional detail of one of the spoke end pockets or seats in the felloe or rim as the same is made ready for assembling the wheel parts.

Figure 6 is a view similar to Figure 5 showing the position of the parts on the completion of the assembly of the wheel.

The wheel here shown is designed to be used particularly with what are known as demountable rims for automobiles, but it may also be used for other purposes by closing in the outside portions of the channel section felloe or rim.

The general object of the invention is to provide an inexpensive and strong wheel having a metal felloe instead of a wooden one.

In the drawings 1 indicates any ordinary hub of an automobile wheel which in general terms is provided with a flange 2, which is integral with the hub. This flange 2 is here shown as the flange at the rear or inside of the hub, but sometimes this flange appears on the front face it being immaterial as relates to my invention which location is chosen.

3 indicates the front flange and 4 the spokes which are clamped between the flanges 2 and 3 by the bolts 5. In the finished wheel the inner ends 6 of the spokes abut directly and tightly against the hub barrel 7 which is the ordinary practice in making what is known as the artillery type of wheel.

The outer ends of my spokes as indicated at 8 are rounded and in the finished wheel are seated in some seats 9 in the steel felloe or rim 10 as is indicated at Figures 1, 2 and 6. The steel felloe rim is made in channel shape with its flanges 11 and 12 projecting outward and furnishing seats for the demountable rim 13 of an ordinary pattern, held in place by the clips 14 and bolts 15 in a form heretofore more or less well known. Other types of rims may be secured to my wheel and the rim shaped to suit the requirements.

In the manufacture of my wheel I first form the rim or felloe with the spoke seats considerably deeper than is required in the finished wheel and these seats thus prepared are indicated at 16 in Figure 5 and are so shaped that the finished spokes may be assembled as indicated by Figures 3 and 4 wherein the spoke ends are entered into the seats 16 in an inclined position and rocked or swung home as shown in Figure 3 wherein there is a clearance between the individual spokes around the hub assembly and a clearance between the ends 6 and the hub barrel 7 as shown.

When the spokes are all assembled in the wheel as indicated by Figure 3, I then, with special machinery, contract or upset the spoke end seats or pockets 16 to the dotted lines position shown in Figure 5 and the full line position shown in Figure 6 which then brings the spokes together at the hub into a tight fit between themselves and the hub barrel 7, making a completely assembled wheel, after which the flange 3 is secured in place, thus finishing the wheel.

The rim or felloe 10 is made of ductile metal which permits the formation and upsetting of the spoke seats 16 and 9, several times as desired in the first construction and the later repair of the wheel.

In thus securing the spokes in place I upset only the metal immediately in and closely adjacent to the spoke seats of the felloe or rim and do not necessarily enlarge or contract the diameter as a whole of the wheel, sufficiently to disturb the seat for the demountable rim.

Thus the rim may be formed and made to size and assembled into the wheel without requiring a new sizing of the rim at the time that the spokes are assembled in fixed position, as I need only to upset or return the metal of the spoke seats, as previously described, which is a great desideratum.

What I claim is:—

1. In a wheel of the class described, a metal felloe formed with spoke seats deeper than required in the finished wheel, and after the spokes are in position the said seats being swaged home, thus fixing the spokes in correct position in the wheel.

2. In a wheel of the class described, a hub, a metal felloe, spokes having rounded outward ends where they join and are seated in pockets in a metal felloe and the said spokes being fastened in position by having the metal of the spoke sockets swaged radially toward the hub without changing the main diameter of the metal felloe.

3. In a wheel of the class described, the combination with a suitable hub, of a metal felloe having spoke-seat depressions primarily allowing the wheel to be assembled with the spokes movable endwise, the metal of said spoke-seat depressions being adapted for radial inward swaging to clamp the spokes rigidly and permanently against the hub.

4. In a wheel of the class described, a metal felloe, a channel section having flanges extending outward and the web of the channel forming the inside face of the felloe and provided with spoke seats made deeper than is required in the finished wheel and with the said spoke seats swaged shorter in the work of assembling the spokes in place.

5. The method of forming a wheel which consists in providing metal sockets for receiving loosely the outer ends of the spokes in the assembled wheel, and then swaging the socket metal inward to hold the spoke end and press the spoke against the hub.

Signed at Chicago, in the county of Cook and State of Illinois, this seventh day of January, 1920.

WILLIAM ERASTUS WILLIAMS.

Witnesses:
J. B. JEFFERSON,
B. J. BERNHARD.